United States Patent Office 3,561,929
Patented Feb. 9, 1971

3,561,929
TERNARY RARE-EARTH COMPOUNDS WITH ELEMENTS OF BOTH FIFTH AND SIXTH GROUPS OF THE PERIODIC SYSTEM
Fritz Hulliger, Uerikon, Switzerland, assignor to American Cyanamid Company, Stamford, Conn., a corporation of Maine
No Drawing. Filed July 29, 1968, Ser. No. 748,228
The portion of the term of the patent subsequent to Apr. 14, 1987, has been disclaimed
Int. Cl. C01f 17/00
U.S. Cl. 23—315        6 Claims

ABSTRACT OF THE DISCLOSURE

New rare-earth compounds having the formula LnXY, in which Ln is yttrium or a rare-earth element except europium and ytterbium, X is sulfur or selenium, and Y is phosphorus or arsenic are prepared at high temperatures either from mixtures of the elements or from the mono-compounds LnX or LnY, which react with the other element. The products may be produced in microcrystalline or single crystal forms and are orthorhombic. The compounds exhibit non-metallic electrical properties and are not transparent. The compounds where Ln is yttrium, lanthanum or lutetium, are non-magnetic while the other compounds show a Curie-Weiss-type paramagnetism around room temperature and probably all will undergo magnetic ordering at temperatures of the order of 10° K.

RELATED APPLICATIONS

Analogous 5f cation compounds of thorium and uranium form the subject of my co-pending applications Ser. Nos. 719,845 and 719,858, both filed Apr. 9, 1968 and now U.S. Pats. 3,570,274 and 3,506,410 respectively.

BACKGROUND OF THE INVENTION

Compounds of rare-earth elements with metalloids of the fifth and sixth groups are known, but no compounds have been prepared with trivalent rare-earth elements or yttrium and one metalloid element of the sixth group and one of the fifth.

SUMMARY OF THE INVENTION

The present invention relates to new chemical compounds having the formula LnXY, in which Ln stands for a rare-earth element except Eu and Yb or yttrium, X is selected from the group consisting of sulfur and selenium, and Y from the group consisting of phosphorus, arsenic and antimony.

The products are crystalline and can be produced as polycrystalline products or as single crystals. If stoichiometric they are orthorhombic in structure and of non-metallic electrical characteristics. Non-stoichiometric compounds of composition $LnY_{1-x}X_{1+x}$ with Y=As or Sb appear to have a structure closely related to the tetragonal PbFCl type which occurs in pure form for $x>0.5$. Only the orthohombic compounds are semiconducting whereas the tetragonal phases are metallic. The compounds with Ln=Y, La, Lu are non-magnetic whereas the other rare-earth compounds display a paramagnetism due to the localized 4f electrons of the trivalent rare-earth ions and probably magnetic transitions at temperatures of the order of 10° K. are possible. The invention includes not only the new products but also a process of making them which can start with the elements of the compound, slowly heating to 800°–900° C., and then after crushing and pressing into pellets, reheating at 1000°–1100° C. Improved mineralization, i.e., larger micro crystals, of the ternary products are obtained if the heating takes place in the presence of traces of iodine or bromine.

Instead of starting with the elements, one may start with the binary compounds, such as LnX or LnY, which are then reacted in pellet form with the other element Y or X, respectively. If it is desired to produce the products in single-crystal form, the final heating should be effected in a considerably larger tube in the presence of sufficient iodine vapor or other halogen vapor to cause halogen vapor transport. For example, the transport zone may have one portion maintained at 1100°–1150° C. and the other portion 50°–100° C. cooler. Single crystals result which are orthorhombic. For a single crystal of GdPS the lattice constants were determined and found to be: a=5.41 A., b=16.76 A., c=5.37 A. Electron beam micro-analysis of the GdPS single crystals showed them to be very homogeneous and yielded the following results:

| | Percent by weight according to micro analysis | | Percent calculated for GdPS |
|---|---|---|---|
| | (a) | (b) | |
| Element: | | | |
| Gd | 70.38 | 70.31 | 71.38 |
| P | 14.83 | 14.25 | 14.07 |
| S | 14.81 | 14.70 | 14.55 |
| | 100.02 | 99.26 | 100 |

ᵃ Using $Gd_2S_3$ (orthorhombic modification) and $U_3P_4$ single crystals as standards.
ᵇ Using $Gd_2S_3$ and UPS single crystals as standards.

The single crystals of GdPS had the form of thin platelets or needles up to 5 mm. in length, but were only some tenths of a mm. thick. The largest dimension corresponded to the c-axis, while the smallest dimension coincided with the b-axis. The GdPS crystals have a color very similar to that of silicon. GdPS crystals have a higher resistivity than sintered GdPS powders, which showed resistivities of the order of 1–10 Ωcm. and a fairly high n-type thermoelectric power, $>200\mu v./°$ C.

The non-metallic electrical characteristics of the ternary products of the present invention render them useful in semiconductor devices.

DESCRIPTION OF THE PREFERRED EMBODIMENTS

The invention will be described in greater detail in conjunction with the following specific examples, in which the parts are by weight unless otherwise specified.

Example 1

A mixture of stoichiometrically equivalent parts of powders of gadolinium, phosphorus and sulfur are slowly heated in an evacuated carbon-coated quartz tube to 800°–900° C. until equilibrium is reached, which may take several days. The tube is then cooled and the reaction products crushed, pressed into pellets, and reheated to 1000°–1100° C. in the presence of traces of iodine or bromine. Well crystallized polycrystalline GdPS is obtained which is orthorhombic, non-metallic, and which becomes anti-ferromagnetic at a temperature near 10° K.

Example 2

Example 1 is repeated but in the second step instead of heating in the presence of traces of iodine or bromine the pellets are subjected to iodine vapor transport with from 1 to 10 mg./cm.³ of the halogen. The equipment, which can be of quartz, is heated at one point to 1100°–1150° C. with another zone maintained at 50° to 100° cooler. Transport results and small single crystals of orthorhombic GdPS are produced. The crystals are non-metallic but not transparent and otherwise have the properties of the polycrystalline material produced by Example 1.

Example 3

The procedure of Example 1 is repeated but in the second step pellets are formed of gadolinium monosulfide and phosphorus and are subjected to the heating to 1000°–1100° C. described in the second step of Example 1. The resulting product, GdPS, has the same chemical and physical properties as the products of Example 1.

Example 4

The second step of Example 1 is repeated but with a mixture of gadolinium monophosphide and sulfur. The product obtained is the same as in Example 1 and has the same properties.

Example 5

The procedure of Example 1 is repeated but the phosphorus is replaced with a stoichiometrically equivalent amount of arsenic. The resulting polycrystalline product is GdAsS. It has the same crystal structure and similar physical properties as the product of Example 1.

Example 6

The procedure of Example 5 is repeated but the sulfur is replaced with a stoichiometrical equivalent of selenium. The product GdAsSe is produced and has similar chemical and physical properties as the product of Example 1.

Example 7

The procedure of Example 5 is repeated, replacing the gadolinium with a stoichiometric equivalent of lanthanum, the produce obtained being LaAsS and has the same crystal structure and similar physical properties as the product of Example 1 except that it is non-magnetic.

Example 8

The procedure of Example 1 is repeated, replacing the gadolinium with a stoichiometrical equivalent of dysprosium, the product obtained being DyPS and has similar physical properties as the product of Example 1 and the same crystal structure.

I claim:

1. A solid crystalline compound having a formula selected from LnPS, LnAsS, and LnAsSe; wherein Ln is an element selected from the rare earth elements except Eu and Yb, said compound having orthorhombic crystalline structure and having electrical properties of a semiconductor.

2. A compound defined by claim 1 having the formula GdPS.

3. The compound GdPS defined by claim 2 in the form of single orthorhombic crystals.

4. A compound defined by claim 1 having the formula GdAsS.

5. A compound defined by claim 1 having the formula GdAsSe.

6. A compound defined by claim 1 having the formula DyPS.

References Cited

UNITED STATES PATENTS

| | | | |
|---|---|---|---|
| 3,174,939 | 3/1965 | Suchow | 23—315X |
| 3,351,435 | 11/1967 | Hulliger | 23—315 |
| 3,356,464 | 12/1967 | Hulliger | 23—315 |
| 3,382,047 | 5/1968 | Holtzberg et al. | 23—50X |
| 3,403,002 | 9/1968 | Hulliger | 23—204 |

HERBERT T. CARTER, Primary Examiner

U.S Cl. X.R.

23—21